(12) United States Patent
Chitalia et al.

(10) Patent No.: US 6,561,542 B2
(45) Date of Patent: May 13, 2003

(54) VEHICLE AIR BAG DEPLOYMENT SYSTEM AND METHOD

(75) Inventors: Janak Chitalia, Westland, MI (US); Jeffrey Steven Vinton, Farmington Hills, MI (US); Sean Timothy Ryan, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 134 days.

(21) Appl. No.: 09/681,903

(22) Filed: Jun. 22, 2001

(65) Prior Publication Data

US 2002/0195805 A1 Dec. 26, 2002

(51) Int. Cl.[7] ............................................... B60R 21/32
(52) U.S. Cl. ...................... 280/734; 280/735; 296/68.1; 701/49
(58) Field of Search ................................. 280/734, 735; 296/68.1; 701/49; 74/512, 513, 514

(56) References Cited

U.S. PATENT DOCUMENTS

| | | | | |
|---|---|---|---|---|
| 5,074,583 A | * | 12/1991 | Fujita et al. | 280/735 |
| 5,531,472 A | * | 7/1996 | Semchena et al. | 280/735 |
| 5,626,359 A | * | 5/1997 | Steffens, Jr. et al. | 280/735 |
| 5,803,491 A | * | 9/1998 | Barnes et al. | 280/735 |
| 5,819,593 A | * | 10/1998 | Rixon et al. | 74/514 |
| 5,822,707 A | * | 10/1998 | Breed et al. | 701/49 |
| 6,234,520 B1 | * | 5/2001 | Breed et al. | 280/735 |
| 6,270,115 B1 | * | 8/2001 | Andreen et al. | 280/735 |
| 6,293,584 B1 | * | 9/2001 | Levine | 280/735 |

* cited by examiner

Primary Examiner—Paul N. Dickson
Assistant Examiner—Deanna Draper
(74) Attorney, Agent, or Firm—Brooks & Kushman, P.C.; Gary A. Smith

(57) ABSTRACT

A method of adjusting air bag deployment in a vehicle having a seat adjustable along a seat track and an adjustable pedal includes sensing the adjusted position of the seat along the seat track and sensing the adjusted position of the adjustable pedal. Air bag deployment is then adjusted based upon the sensed positions of the seat and pedal. Preferably, the air bag is deployable at low output and high output, and the adjusting step includes sending a signal operative to enable or disable the high output of air bag deployment.

7 Claims, 2 Drawing Sheets

VEHICLE AIR BAG DEPLOYMENT SYSTEM AND METHOD

BACKGROUND OF INVENTION

1. Field of the Invention

The present invention relates to a vehicle air bag deployment system and method wherein air bag deployment is adjusted based upon the sensed positions of a vehicle seat and adjustable foot pedal.

2. Background Art

It is known in the vehicle occupant restraint art to provide an air bag in the general proximity of an occupant which inflates in response to an impact signal generated by an impact sensor. Under some circumstances, it has been found desirable to vary the manner in which the restraint is inflated so as to provide an appropriate restraining force. This variation of restraint inflation can be accomplished by moderating the amount of inflation medium, for example, a gas which enters the restraint. It is also known to sense certain occupant characteristics to assist in determining an appropriate restraint inflation. Such characteristics may include whether an occupant is belted, the belt payout, occupant weight, seat incline position, occupant position on a seat, etc.

It is desirable to provide a method and apparatus for adjusting air bag deployment in a manner which is inexpensive and reliable.

SUMMARY OF INVENTION

The present invention provides a method and apparatus for adjusting deployment of an air bag based upon the sensed position of an adjustable seat along a seat track and the sensed position of an adjustable foot pedal, such as a brake pedal or accelerator pedal.

More specifically, the present invention provides a method of adjusting air bag deployment in a vehicle having a seat adjustable along a seat track and an adjustable pedal. The method includes sensing the adjusted position of the seat along the seat track and sensing the adjusted position of the adjustable pedal. Deployment of the air bag is adjusted based upon the sensed positions of the seat and pedal.

Preferably, the air bag is deployable in first (low output) and second stages (high output), and the step of adjusting the deployment of the air bag includes sending a signal operative to enable or disable the second stage. The high output deployment includes first and second stages.

Also, preferably, the seat is adjustable between first, second and third zones, and the adjusting step includes disabling the second stage when the seat is in the first zone, enabling the high output (second stage) when the seat is in the third zone, and enabling or disabling the high output (second stage) based upon the sensed pedal position when the seat is in the second zone.

The enable or disable signal is sent from a driver seat track position module to a restraints control module. The driver seat track position module is operatively connected to a linear seat track position sensor and a pedal position sensor, and the restraints control module is operatively connected to the air bag.

Accordingly, an object of the invention is to provide a method and system for adjusting air bag deployment in a simple, inexpensive and reliable manner by adjusting air bag deployment based upon the sensed position of a seat along a seat track, and the sensed position of an adjustable pedal.

The above object and other objects, features and advantages of the present invention are readily apparent from the following detailed description of the best mode for carrying out the invention when taking in connection with the accompanying drawings.

DETAILED DESCRIPTION

Figure 1:
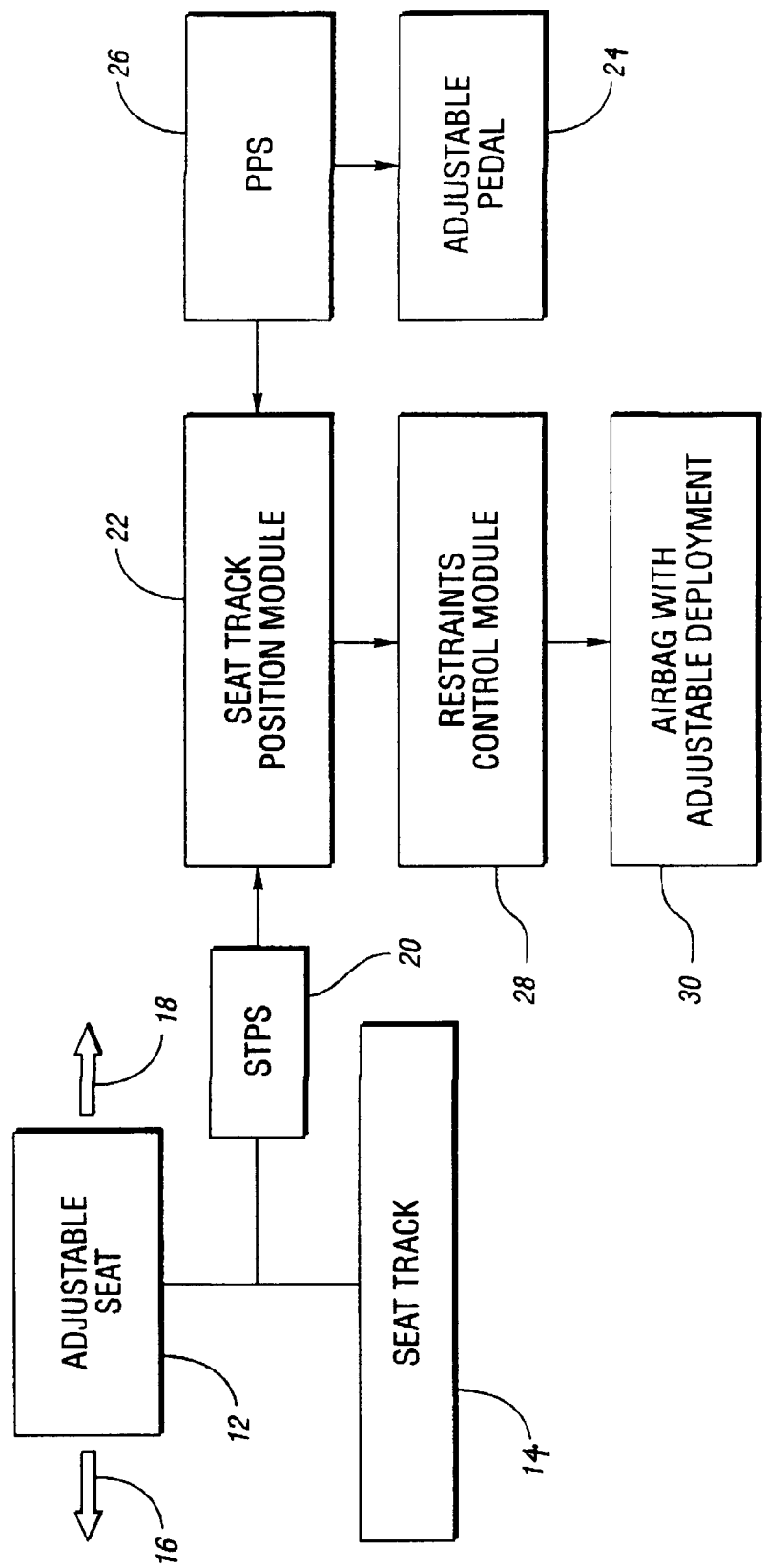
FIG. 1 shows a schematic flowchart of an air bag deployment system in accordance with the present invention.
Figure 2:
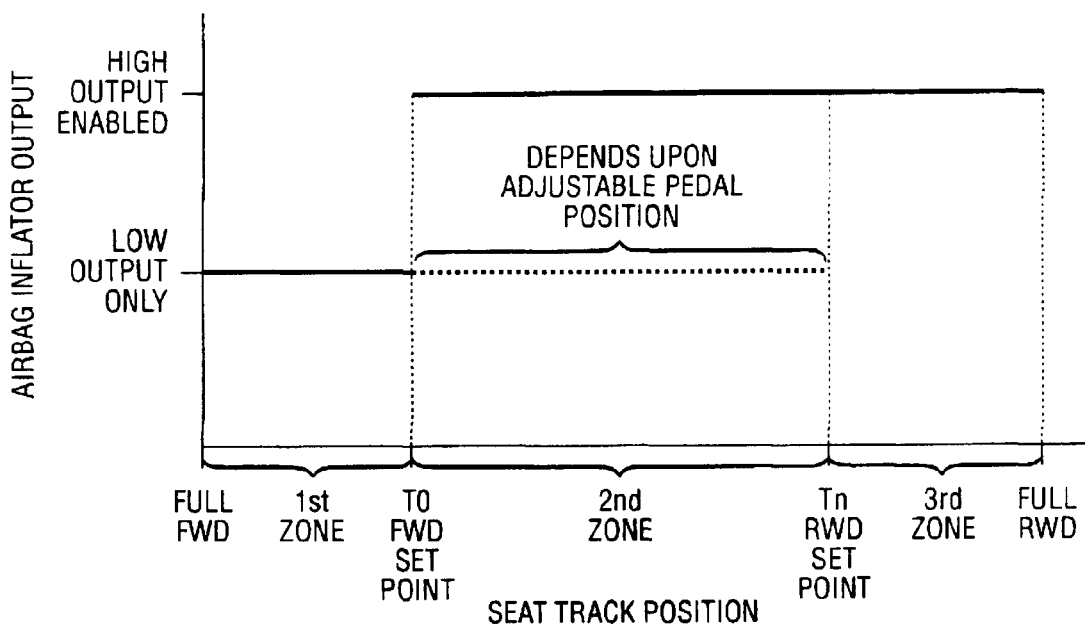
FIG. 2 shows a graphical illustration of air bag inflator output versus seat track position in accordance with the present invention.
Figure 3:
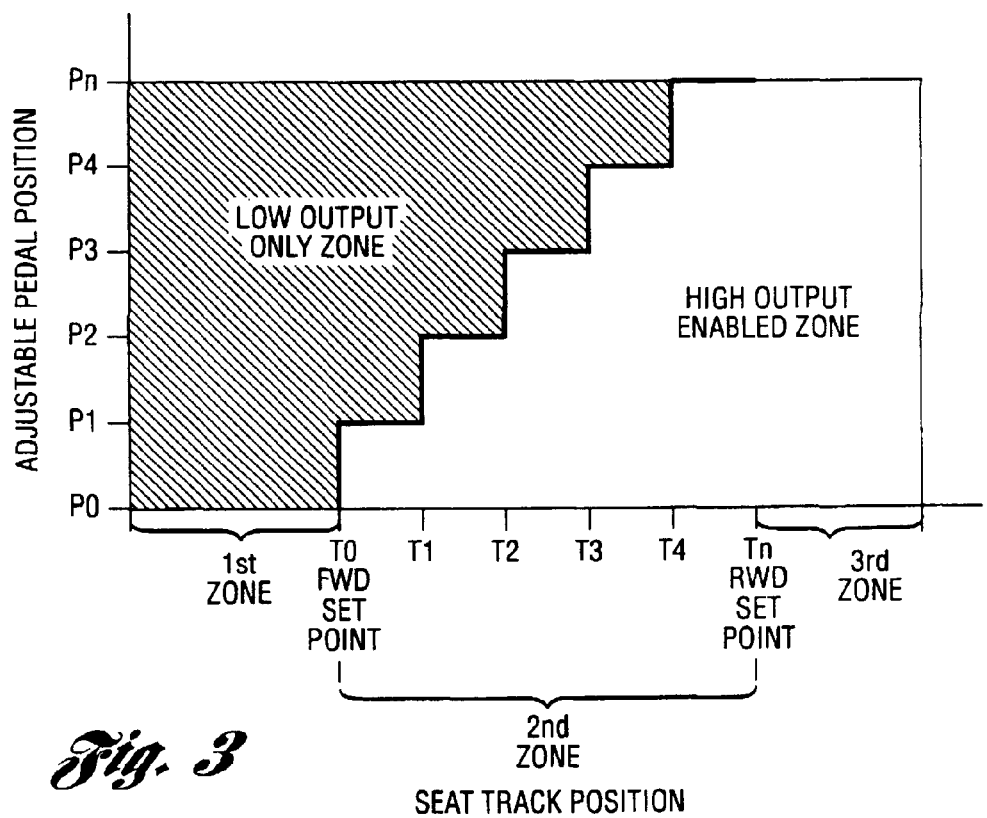
FIG. 3 shows a graphical illustration of adjustable pedal position versus seat track position in accordance with the present invention.

The present invention is described herein with reference to FIGS. 1–3. FIG. 1 shows a schematic flowchart illustrating an air bag deployment system 10 in accordance with the present invention. As shown, an adjustable seat 12 is adjustable fore and aft in the vehicle along the seat track 14, as indicated by the arrows 16,18. A seat track position sensor 20 senses the position of the adjustable seat 12 with respect to the seat track 14, and sends a corresponding signal the seat track position module Alternatively, the seat track and seat may be adjustable together with respect to the floor of the vehicle, and the sensor would sense the adjusted position of the seat and seat track with respect to the floor.

The vehicle is also provided with an adjustable foot pedal 24, such as a brake or accelerator pedal, which is adjustable fore and aft in the vehicle for differently sized drivers. Specifically, drivers of smaller stature can adjust the pedal 24 further rearward for improved access. The smaller statured driver may also adjust the seat further rearward when the pedal is in the rearward position so that the driver may be spaced away from the steering wheel and driver air bag for optimal air bag deployment.

A pedal position sensor 26 senses the adjusted position of the pedal 24, and sends an appropriate signal to the seat track position module 22. Based upon the sensed positions of the adjustable pedal and the adjustable seat, the seat track position module 22 may send an adjustment signal to the restraints control module 28, and the restraints control module 28 will, accordingly, adjust deployment of the air bag 30 between low output and high output.

Preferably, the air bag 30 is deployable in first and second stages. This is achieved by two separate bursts of air bag deployment gas. Air bag deployment is adjusted by sending an "enable" or "disable" signal to the air bag so that the second stage of air bag deployment is selectively enabled or disabled. Low output deployment includes first stage only, and high output deployment includes first and second stages.

When the occupant is in close proximity to the air bag, only low output (first stage only) deployment of the air bag is desired. When the occupant is spaced sufficiently away from the air bag, high output deployment is provided (i.e., first and second stage deployment). This deployment scheme is illustrated in FIGS. 2 and 3. The vertical axis of FIG. 2 represents air bag inflator output, and the horizontal axis represents seat track position (i.e., sensed position of the seat along the track). As shown, when the seat track is positioned in the first zone between a full forward position and a set point, only the low output (first stage) air bag deployment is enabled. In the second zone of the seat track position between the forward set point and rearward set point, the air bag is either low output enabled or high output enabled, depending upon the adjusted pedal position. In the third seat track position zone between the rearward set point and the full rearward position of the seat, the air bag is high output enabled so that both stages actuate.

FIG. 3 shows adjustable pedal position versus seat track position, and corresponds with FIG. 2. As shown, in the first seat track position zone, only low air bag output is enabled, regardless of the adjusted position of the pedal. In the third seat track position zone, high output is enabled, regardless of the adjusted pedal position. However, in the second zone, the high output is enabled or disabled depending upon a function of the seat track position and the pedal position. As shown, this separation between high output and low output depends upon the number of adjusted positions, and may become linear with an infinite number of adjusted or sensed positions of the pedal position and seat position along the seat track. Of course, the logic used in the second zone to determine whether high output is enabled may comprise various step functions or a linear function, and may be tailored to a particular vehicle structure.

Sensor diagnostics are performed to ensure the sensor system is functional. Fault signals can be utilized based upon determined short or open circuit conditions, or upon conditions in which sensor current is outside a predetermined range. The duty cycle for the seat track position sensor will be approximately 0.5 second. In other words, the enable or disable signal is updated twice per second.

While the best mode for carrying out the invention has been described in detail, those familiar with the art to which this invention relates will recognize various alternative designs and embodiments for practicing the invention without departing from the spirit and scope of the invention as defined in the appended claims.

What is claimed is:

1. A method of adjusting air bag deployment in a vehicle having a seat adjustable along a seat track and an adjustable pedal, the method comprising:

sensing the adjusted position of the seat along the seat track;

sensing the adjusted position of the adjustable pedal; and adjusting deployment of the air bag based upon said sensed positions of the seat and pedal, wherein the air bag is deployable at low output and high output and the step of adjusting deployment of the air bag comprises sending a signal operative to enable or disable the high output, and further wherein the seat is adjustable between first, second and third zones, and said adjusting step comprises disabling the high output when the seat is in the first zone, enabling the high output when the seat is in the third zone, and enabling or disabling the high output based upon the sensed pedal position when the seat is in the second zone.

2. The method of claim 1, wherein said adjusting step comprises sending an enable or disable signal from a driver seat track position module (dstp) to a restraints control module, wherein the dstp is operatively connected to a linear seat track position sensor and a pedal position sensor, and the restraints control module is operatively connected to the air bag.

3. The method of claim 1, wherein said adjusting step is performed at regular predetermined time intervals.

4. A vehicle air bag deployment system comprising:

a seat adjustable along a seat track and including a seat position sensor;

an adjustable pedal with a pedal position sensor;

an air bag with adjustable deployment; and a control system operatively connected to the seat position sensor, pedal position sensor and air bag for adjusting air bag deployment based upon signals received from the seat position sensor and pedal position sensor, wherein the air bag is deployable in first and second stages and the control system is operative to enable or disable the second stage, and further wherein the seat is adjustable between first, second and third zones, and the control system is operative to disable the second stage when the seat is in the first zone, enable the second stage when the seat is in the third zone, and enable or disable the second stage based upon the sensed pedal position when the seat is in the second zone.

5. The vehicle air bag deployment system of claim 4, wherein the control system includes a driver seat track position module operatively connected to a restraints control module, wherein the driver seat track position module is operatively connected to the seat position sensor and pedal position sensor, and the restraints control module is operatively connected to the air bag.

6. A method of adjusting deployment of an air bag in a vehicle, wherein the air bag is deployable at a low output and at a high output upon receipt of a high-output enable signal, and wherein the vehicle includes a seat adjustable along a seat track over a range of positions including a first zone, a second zone and a third zone, and an adjustable pedal, the method comprising:

sensing the adjusted position of the seat along the seat track;

sensing the adjusted position of the adjustable pedal; and generating the low output enable signal when the seat is adjusted to the first zone, the low output enable signal and selectively enabling the high-output enable signal to thereby adjust deployment of the air bag based upon the sensed position of the adjustable pedal when the sensed position of the seat is in the intermediate range, and both the low output and high output signal when the seat is adjusted to the third zone.

7. The method of claim 6, wherein generating is further based upon the relative sensed position of the seat within the intermediate range.

* * * * *